(12) United States Patent
Klein et al.

(10) Patent No.: US 7,604,244 B2
(45) Date of Patent: Oct. 20, 2009

(54) WELDING CARRIAGE WITH CHANGEABLE WHEEL CONFIGURATION AND MODULAR CONSTRUCTION

(75) Inventors: Jeffrey R Klein, Mentor, OH (US); Lawrence A Boehnlein, Chardon, OH (US); Lucian Petrila, Westlake, OH (US); Edward Enyedy, Eastlake, OH (US)

(73) Assignee: Lincoln Global, Inc., City of Industry, CA (US)

( * ) Notice: Subject to any disclaimer, the term of this patent is extended or adjusted under 35 U.S.C. 154(b) by 292 days.

(21) Appl. No.: 11/778,896

(22) Filed: Jul. 17, 2007

(65) Prior Publication Data

US 2009/0020970 A1    Jan. 22, 2009

(51) Int. Cl.
*B62B 3/02* (2006.01)
(52) U.S. Cl. .............. 280/35; 280/656; 280/47.34; 219/121.45; 219/124.31; 16/19
(58) Field of Classification Search ............ 219/121.45, 219/124.1, 124.31, 125.1; 16/18 R, 19, 29, 16/30, 31 R, 40; 280/638, 35, 656, 47.34, 280/79.11
See application file for complete search history.

(56) References Cited

U.S. PATENT DOCUMENTS

| | | | |
|---|---|---|---|
| 1,098,165 A | 1/1965 | Damon | |
| 3,201,561 A * | 8/1965 | Damon | 219/124.31 |
| 4,131,783 A | 12/1978 | Kensrue et al. | |
| 4,328,412 A * | 5/1982 | Watanabe et al. | 219/125.1 |
| 7,241,973 B1 | 7/2007 | Di Novo et al. | |
| 2008/0093345 A1* | 4/2008 | Enyedy et al. | 219/121.45 |

FOREIGN PATENT DOCUMENTS

| | | |
|---|---|---|
| EP | 1327494 A1 | 7/2003 |
| WO | 2008033653 A1 | 3/2008 |

* cited by examiner

*Primary Examiner*—Christopher P Ellis
*Assistant Examiner*—John D Walters
(74) *Attorney, Agent, or Firm*—Paul, Hastings, Janofsky & Walker LLP (57) ABSTRACT

An invention is provided which comprises a welding carriage having a base, rear wheel assemblies disposed at one end of the base, a first front wheel assembly attachment member disposed on a second side of the base, and a first front wheel assembly configured to removably engage with the front wheel assembly attachment member to securely couple with the base. The welding carriage may also include a second front wheel assembly attachment member disposed on a second side of the base, and a second front wheel assembly configured to removably engage with at least the at least one front wheel assembly attachment member to securely couple with the base. The carriage may also include at least two welding attachment portions, where both welding attachment portions have the same cross-sectional characteristics.

23 Claims, 6 Drawing Sheets

WELDING CARRIAGE WITH CHANGEABLE WHEEL CONFIGURATION AND MODULAR CONSTRUCTION

FIELD OF THE INVENTION

The present invention is directed to the field of welding, more specifically to welding carriages.

BACKGROUND OF THE INVENTION

Large weldments benefit from automated, high deposition welding. Some applications designed for large weldments employ large robots or gantry-type positioners for moving the weld equipment into position. Other applications require the use of a travel carriage or tractor for carrying the welding equipment.

The Lincoln Electric Co. of Cleveland, Ohio has successfully sold welding carriages known as the LT-7 and LT-56 carriages for many years. These carriages were based upon a three-wheel design—one wheel in the front for guiding and steering and two wheels in the rear for propulsion. The three-wheel design tracked well because all three wheels were in contact with the surface. The disadvantage to the three-wheel design was that in some joint configurations, the carriage is prone to tipping.

Other manufacturers have utilized a four-wheel design. The four-wheel design is less prone to tipping. However, it is more difficult to create a simple steering mechanism and not all four wheels may always be in contact with the ground. Thus, the four-wheel design, like the three-wheel design, is appropriate in certain applications, but is problematic in others.

Both the three-wheel and four-wheel designs are adaptable to track systems. Track systems are used when the weld joint does not provide a reliable path for guiding the carriage. Instead, one or more wheels or guides on the carriage align with the rail on the track to provide direction.

Because of the low demand for welding travel carriages, welding equipment manufacturers generally offer only the three-wheel or only the four-wheel carriage. Further, the cost to consumers to purchase, maintain and operate both three-wheel and four-wheel carriages has generally required consumers to pick between either a three-wheel design or a four-wheel design.

Additionally, existing welding carriages fail to provide the needed flexibility that is desired for different welding requirements. Specifically, different weldments often require different welding equipment or a different welding equipment configuration. Thus, there is a need for a welding carriage structure to flexible in its applications so as to allow for the carriage to be used in a plurality of different welding applications with little or no modification to the carriage. Current welding carriage manufactures attempt to address this by offering for sale various welding carriage kits or configurations, where each separate kit or configuration is to be used for a particular welding application. This solution is costly and requires the welder to store and maintain a number of different welding kits, in addition to the carriage assembly itself.

Accordingly, there is a need for a welding carriage which can operate in as both a three-wheel carriage and a four-wheel carriage, and one which has a modular construction so as to be able to be easily used in a plurality of configurations.

SUMMARY OF THE INVENTION

Various exemplary embodiments of the present invention will be discussed below.

An invention is provided which comprises a welding carriage having a base, rear wheel assemblies disposed at one end of the base, a first front wheel assembly attachment member disposed on a second side of the base, and a first front wheel assembly configured to removably engage with the front wheel assembly attachment member to securely couple with the base. The welding carriage may also include a second front wheel assembly attachment member disposed on a second side of the base, and a second front wheel assembly configured to removably engage with at least the at least one front wheel assembly attachment member to securely couple with the base.

Another embodiment of the present invention contains a first welding equipment mounting structure which is mounted to the welding carriage base extending from an upper surface of the base, and a second welding equipment mounting structure coupled to the first welding equipment mounting structure. In an embodiment of the present invention, both the first and second welding equipment mounting structures have the same cross-sectional characteristics.

BRIEF DESCRIPTION OF THE DRAWINGS

The advantages, nature and various additional features of the invention will appear more fully upon consideration of the illustrative embodiments of the invention, which are schematically set forth in the figures, in which.

DETAILED DESCRIPTION OF EXEMPLARY EMBODIMENTS

Disclosed is a welding carriage easily convertible between three-wheel operation and four-wheel operation. In a further embodiment the welding carriage has a modular design. The present invention results in a welding carriage that can be configured in many orientations, and is therefore more flexible and versatile for users. Also, because the design may include many common components, it is more manufacturable and requires fewer replacement parts for welding carriage manufactures to manufacture and consumers to keep in stock.

With reference to FIGS. 1A through 1F, an exemplary embodiment of a welding carriage 100 consistent with the present invention will now be described. FIGS. 1A-D illustrates a welding carriage 100 having a base 102, a right front wheel assembly 104, a left front wheel assembly 106, rear wheel assemblies 108, front wheel assembly attachment members 110, and a welding equipment mounting member 112 (which can also be referred to as a mast). Rear wheel assemblies 108 are attached to base 102 by any conventional or known method, such as by an axle. Rear wheel assemblies 108 may be connected to drive assemblies (not shown) configured to drive the welding carriage 100 by causing the rear wheel assemblies to rotate.

Control of the movement of the welding carriage 100 is by any conventional known method or means. For example, it is contemplated that the carriage 100 be controlled automatically via a computer control system, or manually as needed. The present invention is not limited in this regard.

Attached to base 102 are front wheel assembly attachment members 110. Front wheel assembly attachment members 110 are configured to couple with attachment ends 104a, 106a of right front wheel assembly 104 and a left front wheel assembly 106. Namely, the attachment members 110 are used to removably couple the assemblies 104, 106 with the base 102.

The coupling or attachment between front wheel assembly attachment members 110 and attachment ends 104a, 106a of right front wheel assembly 104 and left front wheel assembly 106 securely hold the right front wheel assembly 104 and/or the left front wheel assembly 106 to the base 102 during operation of the carriage, while allowing efficient removal of the right front wheel assembly 104 and/or left front wheel assembly 106 when needed. Each of the attachment members 110 are secured to the base by any known or conventional used means, and are made of any conventionally known material.

In an embodiment of the invention, the attachment members 110 are configured such that they allow for the removable attachment of the wheel assemblies 104/106 in an interchangeable and flexible fashion. Specifically, as shown in FIGS. 1B and 1C the wheel assemblies 104/106 are interchangeable between the left and right side of the base 102. Additionally and alternatively, the wheel assemblies 104/106 can be mounted in such a way where the wheel is extending out away from a centerline of the base 102 or can alternatively be mounted such that the wheel is extending toward the centerline of the base. This can be seen in FIGS. 1B and 1C, for example.

In an embodiment of the invention, the wheel assemblies 104/106 are secured to the attachment members 110 with a quick release or pressure type fit, such that the wheel assemblies 104/106 are secured during use of the carriage 100, but can be easily removed or reconfigured with minimal effort. Examples include, quick release pins, spring-activated pins or fasteners, screws, bolts, or the like.

Figure 1A:
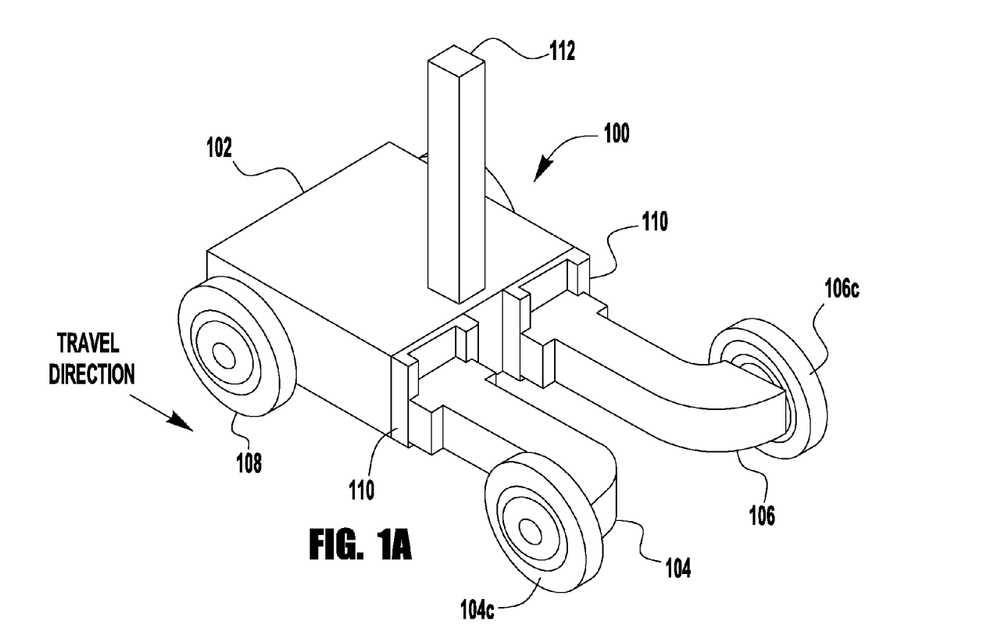
FIGS. 1A through 1F are perspective views of an exemplary embodiment of a welding carriage consistent with the present invention depicted in numerous configurations.
Figure 1B:
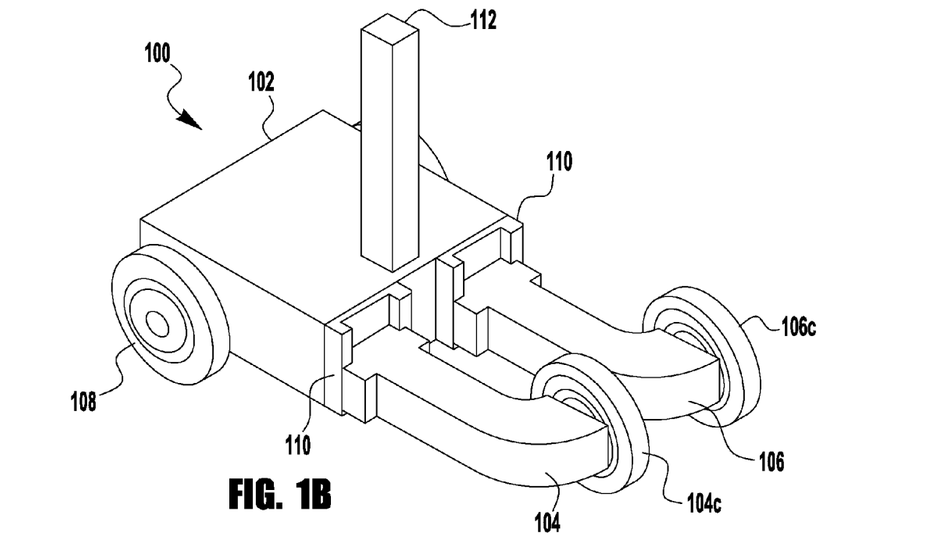
Figure 1C:
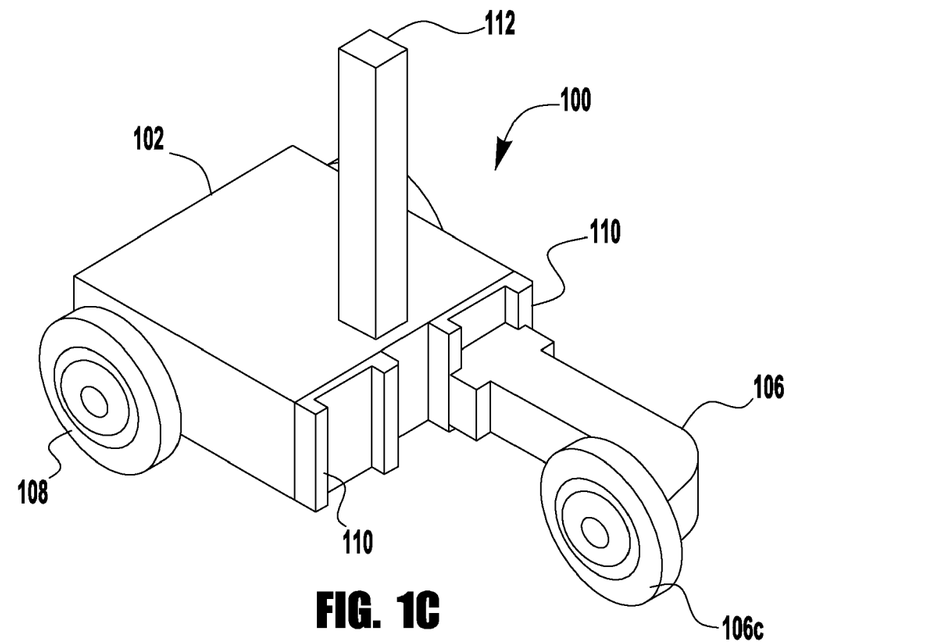
Figure 1D:
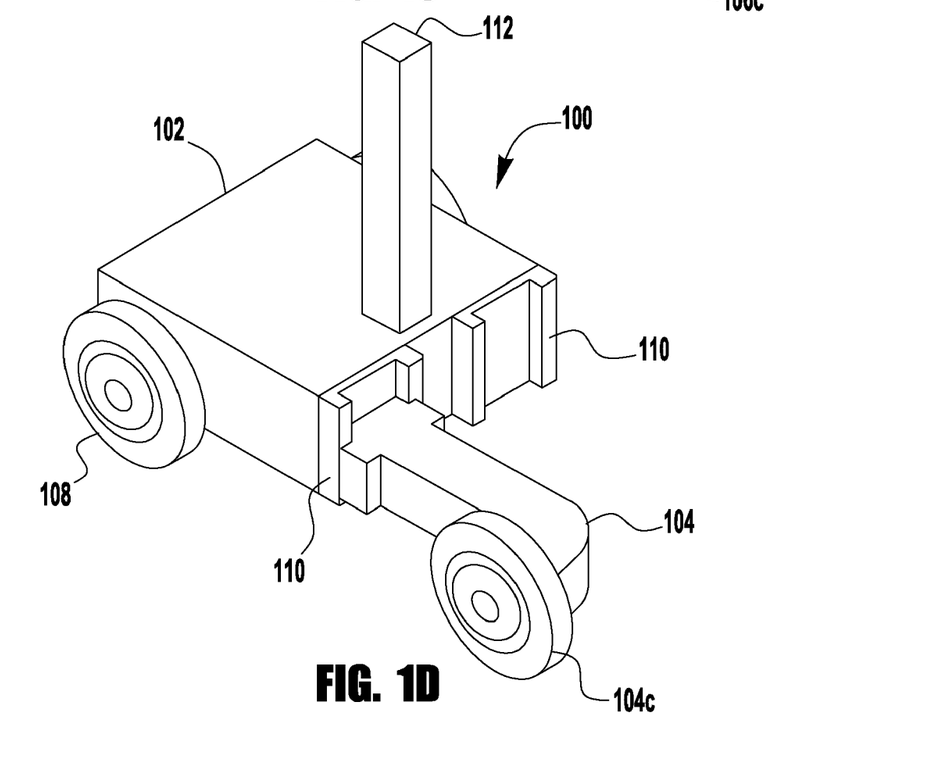
Figure 1E:
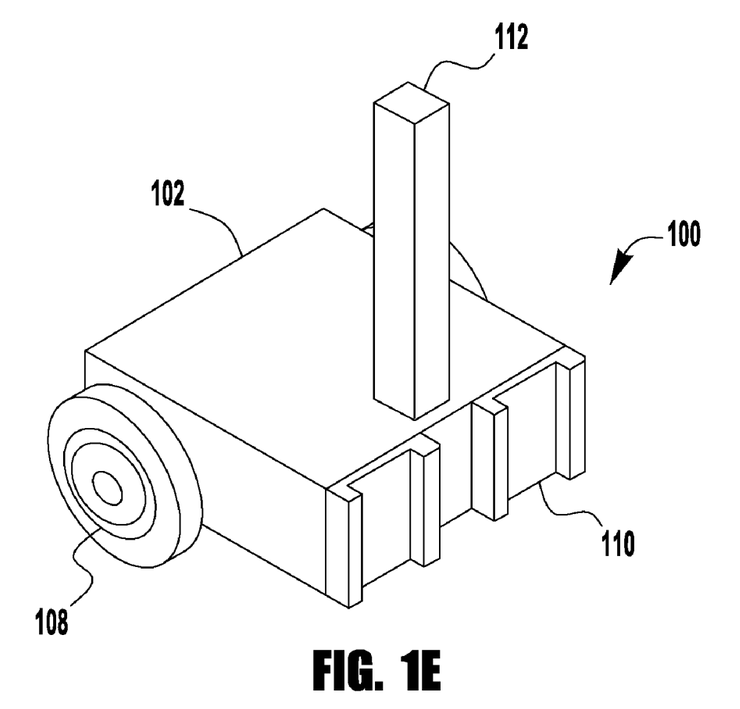
Figure 1F:
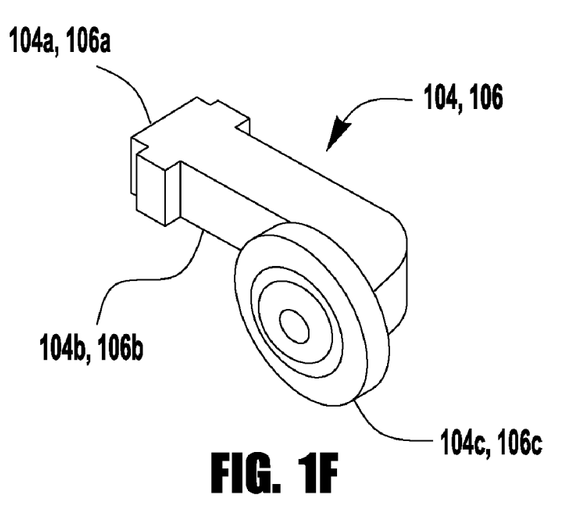

As shown in FIG. 1F, the right front wheel assembly 104 and left front wheel assembly 106 each include an attachment end 104a, 106a, a support arm 104b, 106b, and a wheel 104c, 106c. The right front wheel assembly 104 and the left front wheel assembly 106 are designed to allow for multiple welding configurations, and interchangeability on the welding carriage assembly 100. The present invention is not limited by the material or cross-sectional aspect of the assemblies 104/106. However, common materials may be used for the components of the wheel assemblies 104/106, and should be selected, at least in part, based on the environment on which the welding carriage 100 will be operated.

It is further noted that although FIGS. 1A through 1F depict the wheels as being positioned off-center from the support arms 104b/106b respectively, the present invention is not limited to this configuration. In an alternative embodiment of the present invention, the wheels 104c/106c are positioned along the centerline of the arms 104b/106b. The present invention is not limited in this regard, nor is it limited with regard to how the wheels 104c/106c are mounted to the support arms 104b/106b.

The following discussion will now turn to each of FIGS. 1A through 1F respectively and provide an explanation of the aspects of the present invention shown in each Figure.

FIG. 1A illustrates an embodiment of a welding carriage 100 in a four-wheel configuration. Here, both the right front wheel assembly 104 and the left front wheel assembly 106 are attached to the base 102 with the front wheel 104c, 106c directed outward from the centerline of the base 102. Also, a mounting member (i.e. mast) 112 is coupled to the body 102 so as to permit the mounting of additional welding equipment, which will be discussed in more detail below. Further, although the travel direction is indicated as from the rear wheels 108 toward the wheels 104c/106c, the present invention is not limited in this way, and the carriage 100 can be moved in either direction depending on the operational needs for any particular welding operation.

FIG. 1B illustrates another embodiment of the welding carriage 100 in a four-wheel configuration with both the right front wheel assembly 104 and the left front wheel assembly 106 having their front wheels 104c, 106c facing the same direction. Although in this figure the wheels are facing to the left of the carriage 100, the invention is not limited in this regard as the wheels can be easily switched to face the opposite direction, depending on the application and environment on which the carriage assembly 100 is being used.

FIG. 1C illustrates another embodiment of the welding carriage 100 in a three-wheel configuration with only the left front wheel assembly 106 attached to the base 102. Here, the left front wheel assembly 106 is attached to the base 102 in such a manner that the front wheel 106c is directed inward. Of course, because of the nature of the invention, the assembly 106 can be switched so that the wheel 106c is facing outboard. Further, rather than the left wheel assembly 106, the right wheel assembly 104 may also be used in a similar manner.

FIG. 1D illustrates another configuration of the welding carriage 100 in a three-wheel configuration with only the right front wheel assembly 104 attached to the base 102. Here, the right front wheel assembly 104 is attached to the base 102 in such a manner that the front wheel assembly 104c is directed outward. Of course, because of the nature of the invention, the assembly 104 can be switched so that the wheel 104c is facing inward. Further, rather than the right wheel assembly 104, the left wheel assembly 106 may also be used in a similar manner.

FIG. 1E illustrates the base 102 without either the right front wheel assembly 104 or the left front wheel assembly 106 attached.

FIG. 1F illustrates a front wheel assembly 104, 106. As shown, the assemblies 104/106 have an attachment end 104a, 106a which is the end coupled to the attachment members 110, to secure them to the base 102. The support arm 104b, 106b extends from the attachment end 104a/106a so as to locate the wheel 104c, 106c, some distance remote from the attachment end 104a/106a. The present invention is not limited to the specific embodiment shown in this figure as the wheel assemblies 104/106 can be configured in any number of ways such that the present invention is achieved.

In the exemplary embodiment illustrated in FIG. 1A through FIG. 1F, the front wheel attachment member 110 is a generally channel-shaped member designed to engage a pair of recesses on the attachment ends 104a, 106a of the front wheel assemblies 104, 106. The front wheel attachment members 110 and the attachment ends 104a/106a are not, however, so limited and can have any number of configurations. However, the front wheel attachment members 110 and the attachment ends 104a/106a allow for the wheel assemblies 104/106 to be efficiently removed and reposition on the base 102.

In an embodiment of the present invention, the wheel assemblies 104/106 are identical such that either could be used on either the left and/or right side of the carriage 100 interchangeably. In such an embodiment, the wheel assemblies 104/106 are not specifically designed for the right or left side of the carriage 100. Such an embodiment increases the workability and flexibility of the carriage 100.

Figure 2A:
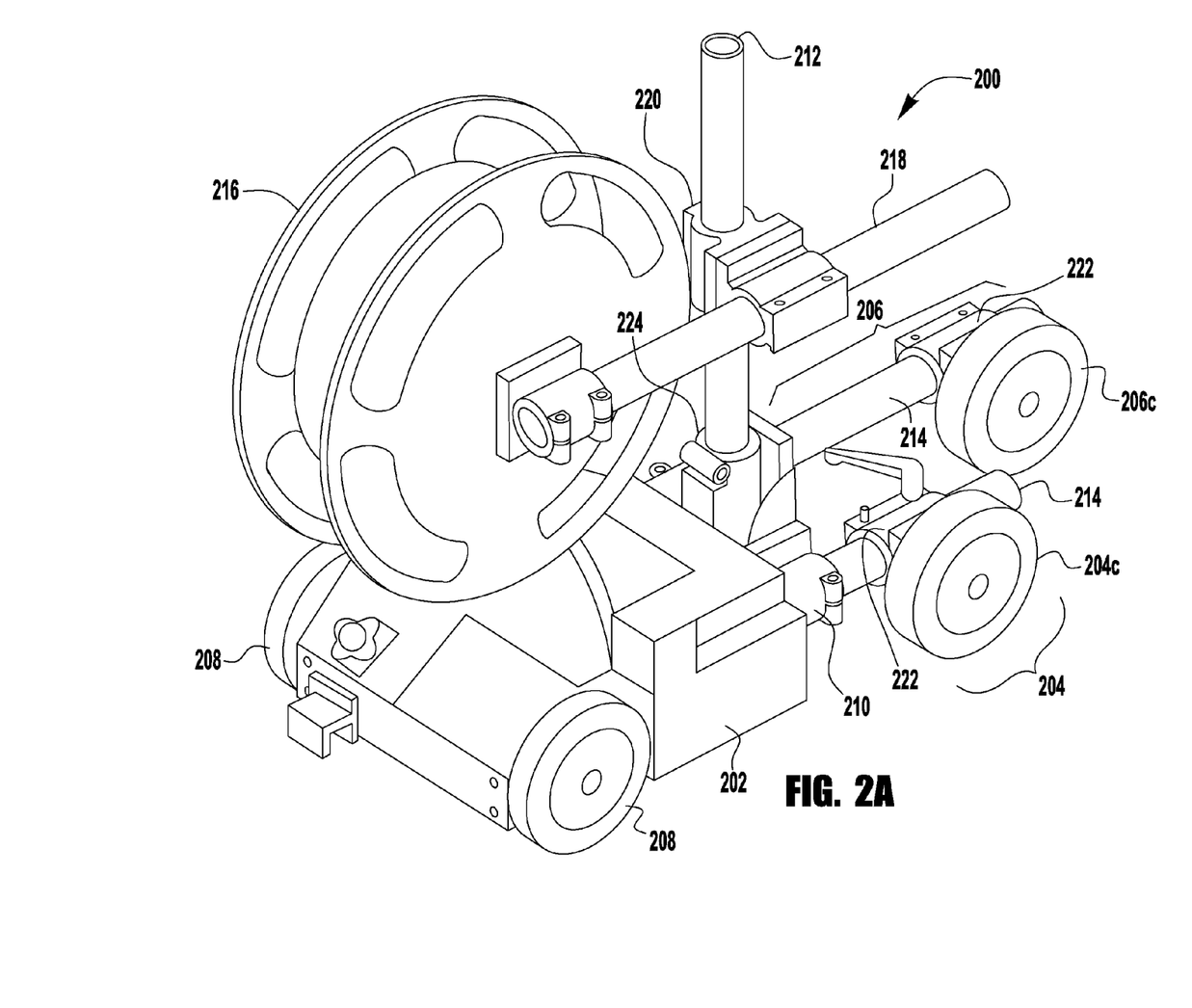
FIG. 2A illustrates a welding carriage according to another embodiment of the present invention.
Figure 2B:
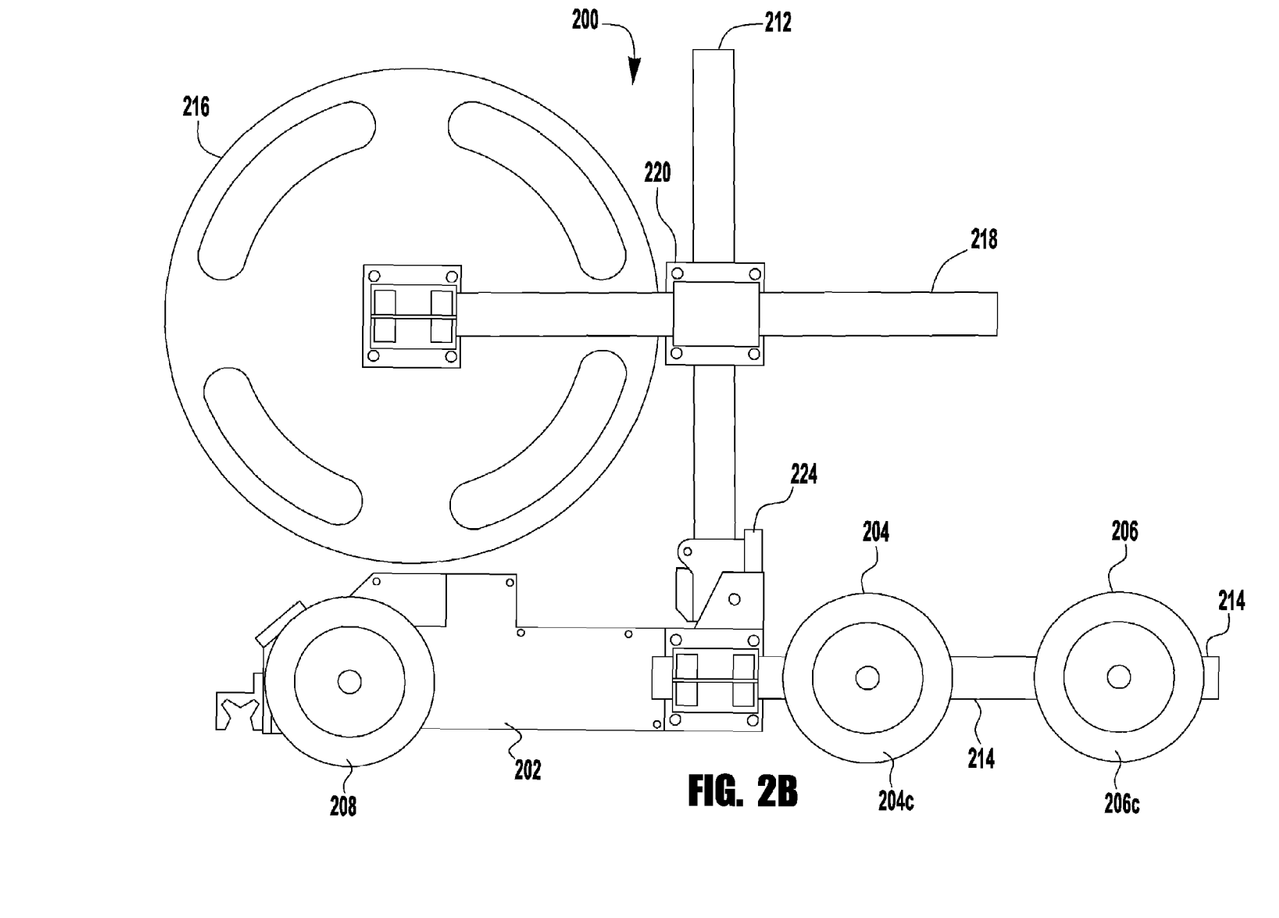
FIG. 2B illustrates side view of the welding carriage illustrated in FIG. 2A.

Turning now to FIGS. 2A and 2B, a further embodiment of the present invention will now be discussed. FIGS. 2A-B illustrate an additional exemplary embodiment of a welding carriage consistent with the invention disclosed in this patent application.

In the exemplary embodiment of FIGS. 2A-B, a welding carriage 200 includes a base 202, right front wheel assembly 204, left front wheel assembly 206, rear wheel assemblies 208, mounting arm attachment members 210, welding equipment mounting member (mast) 212, and a front wheel assembly mounting arm 214. The base 202 may also include a motor and drive assembly (not shown) for propelling the welding carriage by causing the rear wheels of the rear wheel assemblies 208 to rotate. Additionally, a second equipment mounting member 218 is coupled to the equipment mounting member 212 with an attachment portion 220.

In an exemplary embodiment of FIGS. 2A and 2B, front wheel assemblies 204, 206 may be longitudinally moved relative to one another in the direction of travel of the welding carriage 200. The wheel assemblies may also be configured to allow for inboard and outboard positioning of the wheels of the front wheel assemblies 204, 206 (similar to that shown in FIGS. 1A to 1D). Thus, as illustrated in FIG. 2A, left front wheel assembly 206 is positioned ahead of the right front wheel assembly 204. Many other arrangements can, of course, exist. For example, the wheels 204c/206c can be positioned such that they are directed away from the centerline of the carriage 200, at the centerline, or some combination thereof. This is illustrated in the embodiments shown in FIGS. 1A through 1D. Further, the wheels 204c/206c can be positioned the same distance from the base 202, or at some alternating distances as shown. The configuration of this embodiment of the present invention allows for this flexibility.

Figure 3A:
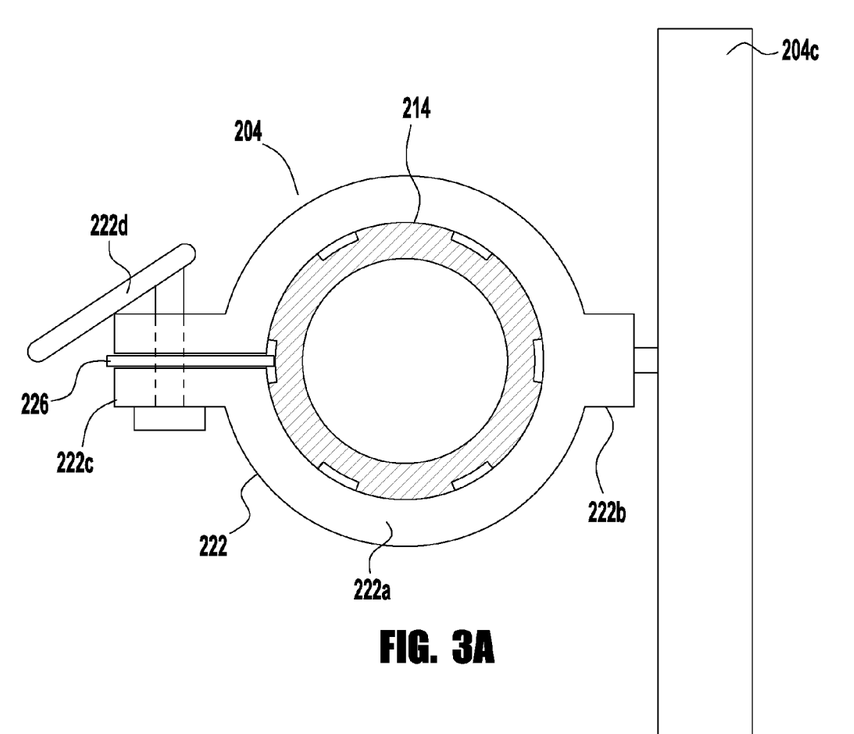
FIG. 3A illustrates a cross-sectional view of one exemplary embodiment of longitudinally-movable front wheel assemblies consistent with the embodiment the present invention illustrated in FIG. 2A and FIG. 2B.

To allow the front wheel assemblies 204, 206 to be longitudinally moved on front wheel assembly mounting arms 214, the front wheel assemblies 204, 206 include an attachment portion 222. The attachment portion 222 secures the wheels 204c/206c to the arms 214. An embodiment is illustrated in FIG. 3A which shows the attachment portion 222 securing the wheel 204c to the arm 214. As shown in this embodiment a clamp type structure is used for the portion 222 to secure it to the arm 214. Thus the attachment portion 222 contains a wheel mounting portion 222b, a securing portion 222a and a securing mechanism portion 222c. The wheel mounting portion 222b secures the wheel 204c to the remainder of the attachment portion 222 and allows the wheel to rotate during operation. The securing portion 222a secures the attachment portion 222 to the arm 214 by encompassing the periphery of the arm 214. The securing mechanism portion 222c is used to provide the securing force to secure the attachment portion 222 to the arm. For example, in the embodiment shown in FIG. 3A the securing mechanism portion 222c employs a compression force to provide a frictional engagement between the arm 214 and the portion 222, so as to prevent movement.

When the compression force is removed, the attachment portion 222 can be moved along a length of the arm 214 to adjust the relative position of the wheel. Additionally, it is contemplated that in an embodiment of the invention, not only can the attachment portion 222 be moved longitudinally along the arm 214 but it can be rotated on the arm 214. Such rotation allows the wheel 204c to be placed at any desired angle for operation of the carriage 200. For example, if the carriage is to be operated on an angled surface, the wheels can be angled accordingly.

Although not shown in FIG. 3A, it is also contemplated that the arm 214 has a groove or a series of grooves (alternatively a protrusion or a series of protrusions), which engage with corresponding grooves/protrusions in the securing portion 222a. The grooves/protrusions provide a locking effect to assist in prevent rotation or unintentional movement of the attachment portion 222 during operation.

It is noted that even though an embodiment of the attachment portion 222 is shown in FIGS. 2A and 3A, the present invention is not limited to this embodiment. It is understood that it is well within the skill of those of ordinary skill in the art that many different attachment portions or mechanisms can be used to secure the wheels 204c/206c to the arms. It is further understood that any known and conventional means or methods can be used to accomplish this, while at the same time allowing for easy movement and alteration of the wheel location along the arm. For example, a spring loaded securing mechanism can be used, a pin or fastener securing mechanism can be used, a tensioning type mechanism can be used, etc. The present invention is not limited in this regard, and the configuration shown in the Figures is only intended to be an illustrative embodiment and does not limit the present invention in any way.

Of course, any known or conventional used materials can be used for the above discussed components and are to be selected based on at least operational, design and environmental concerns.

Further, although FIGS. 2A and 3A show the attachment portion 222 using a fastener 222d to provide the fastening force, the present invention is not limited in this regard. Further, the fastener 222d can be any one or, or combination of, commonly used fasteners, including but not limited to snaps, nuts and bolts, pins, clevises, springs, quick release pins, or the like.

The mounting arms 214 are securely coupled to the welding carriage base 202. In one embodiment, mounting arms 214 are attached to the base 202 by mounting arm attachment members 210, which can comprise any number of well known structures. Alternatively, front arm mounting arms 214 can be welded to base 202, molded into base 202, or otherwise coupled with base 202 in any number of known manners. In a further embodiment, the arms 214 are slidably engaged with any one of the base 202 or the mounting members 210, or a combination of both. In such an embodiment, the arms 214 can be slid further into or out of the base 202 to adjust their length. Therefore, with such an embodiment, if it desired to reduce the overall length of the carriage 200, without employing different arms 214, the arms can be slid into the base 202, without requiring cutting or replacement of the arms 214.

In the embodiment illustrated in FIGS. 2A, 2B and 3A, the front arm mounting arms 214 are generally circular in cross section. However, the invention is not so limited. The front arm mounting arms 214 can be, inter alia, bar-shaped, oval-shaped, square-shaped, or polygonal-shaped. The present invention is not limited in this regard. Further, the arms 214 can be hollow or solid material.

Thus, as with the previously discussed embodiment, a welding carriage consistent with the embodiment illustrated in FIGS. 2A and 2B can operate in three-wheel of four-wheel mode. Further, in both three-wheel of four-wheel mode, the front wheels can have multiple orientations (inward or outward) and can be positioned in many positions longitudinally and/or radially along the length of mounting arms 214.

Figure 3B:
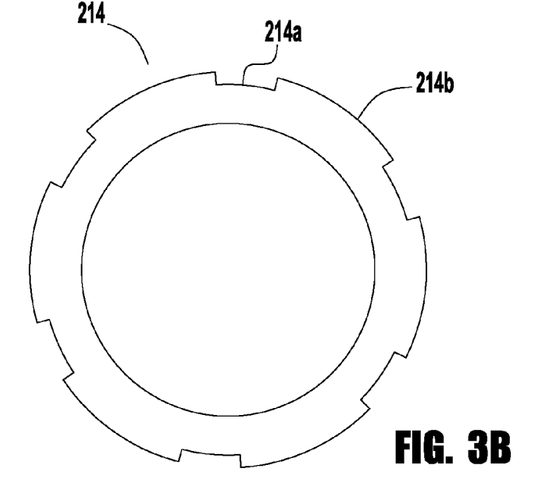
FIG. 3B illustrates a cross-sectional view of a wheel mounting arm and/or equipment mounting structure in accordance with an embodiment of the invention.

FIG. 3B depicts a cross-section of an exemplary embodiment of the arm 214 in accordance with an aspect of the present invention. The arm 214 has a plurality of grooves 214a which radially extend inward from an outer surface 214b of the arm 214. As discussed above, the grooves 214a are employed to interlock with corresponding protrusions in the attachment portion 222 (not shown) to secure the assembly 204/206 during operation. The present invention is not limited with regard to the shape or number of the grooves. For example, it is contemplated that in one embodiment there is a single locking groove/protrusion, while in another embodiment there are many grooves/protrusions. Further, the present invention is not limited with regard to the dimensions and cross-sectional shapes of the grooves 214a. Further, it is contemplated that in an alternative embodiment a series a protrusions (not shown) can be employed which extend radially outward from the surface 214b of the arm 214 to engage with corresponding grooves in the attachment portion 222. It is further contemplated that the arm 214 can have any combination of grooves and protrusions within the surface 214b of the arm 214 to interact with the attachment portion 222. Further, although the embodiment shown in FIGS. 2A and 2B depict grooves which run longitudinally along the entire length of the arm 214, the present invention is not limited in this regard as the grooves/protrusions can run radially or have a discontinuous nature. It is further contemplated that dimples, or the like can be used on the arm 214.

As shown in FIGS. 2A and 2B a welding equipment mounting member 212 (or mast structure) extends vertically from the base 202. The mounting member 212 is employed to mount various pieces of welding equipment which is to be carried along with the carriage 200 during a welding operation. In one embodiment of the present invention, the welding equipment is mounted directly to the mounting member 212. However, as shown in FIGS. 2A and 2B a second equipment mounting member 218 is secured to the mounting member 212. As shown in FIGS. 2A and 2B the second mounting member 218 (or crossbar) is mounted perpendicular to the mounting member 212. However, the present invention is not limited in this regard as either the mounting member 212 can be mounted at an angle other than 90 degrees to the surface of the base 202, and the second mounting member 218 can be mounted at an angle, other than 90 degrees, to the mounting member 212.

In an embodiment of the invention, both the mounting member 212 and the second mounting member 218 have the same outer cross-sectional characteristics. This is done to allow for interchangeability and flexible operation of the carriage 200 in multiple welding applications, without the need for different mounting structure. Of course, even though a single second mounting member 218 is shown in FIGS. 2A and 2B, the present invention is not limited in this regard as more than one second mounting members may be mounted to the mounting member 212.

The second mounting member 218 is configured to allow for various welding devices or equipment to be coupled to the member 218. For example, as depicted an electrode spool 216 may be mounted to the member 218. The present invention is not limited in this regard as many different types and kinds of welding equipment can be mounted to either mounting member 212/218.

The mounting member 212 is secured to the base 202 with an attachment portion 224. The attachment portion 224 can be of a similar construction to that of the attachment members 210 or the portion 222, or be of the generally same construction. In an embodiment of the invention, the attachment portion 224 is of a type which allows the mounting member 212 to be raised or lowered vertically and/or be rotated about its axis. Such an embodiment maximizes the flexibility and usability of the carriage 200.

The second mounting member 218 is coupled to the mounting member 212 with another attachment portion 220, of similar construction and function as the previously discussed attachment portions. In an embodiment of the invention, the attachment portion 220 is of a construction which allows either of the mounting members 212/218 to be rotatable within the attachment portion 220, and/or longitudinally movable within the attachment portion 220. In an embodiment of the invention, the attachment portions 220 and/or 224 are of a construction to allow the easy change from one configuration to another. For example, in an embodiment the attachment portions have a similar construction and operation as the portion 222, described above, the discussion of which is incorporated here by reference.

Further, the electrode spool 216 (or any other welding equipment) is mounted to the members 212/218 with a similar type attachment portion, to provide additional flexibility in operation and configuration. This allows the attached welding equipment (for example the spool 216) to be able to be moved longitudinally along the length of the portion 218, as well as be rotated on the portion 218.

In a further embodiment of the present invention, the mounting members 212/218 have the same outer cross-sectional characteristics as the arms 214. This is to maximize operational flexibility and efficiency, as the components become interchangeable, and allow for ease of maintenance and storage of replacement components. It is further contemplated that the various attachment portions employed by the present invention are similar in structure so as to maximize product flexibility and efficiency, as well as minimize costs for replacement parts and maintenance.

Examples of components which can be mounted on either of the mounting members include: wire reel spindles, flux hoppers, wire drives, pendants, control boxes, pre-heat torches, laser tracking devices, vision tracking devices, etc.

Also shown in the embodiment of FIG. 3A is a key portion 226. In the shown embodiment the key portion 226 engages with the grooves 214a of the arm 214 such that when the attachment portion 222 is loosed (to allow movement) the attachment portion 222 does not uncontrollably rotate around the arm 214. Of course, although this figure shows the arm 214 for the wheel assemblies, this similar configuration can be used on the mounting members 212/218, as the mounting of components is similar in nature, and can be the same, between the wheel mounting structure and the welding equipment mounting structure. It is contemplated that during the use of the present invention the wheel, welding component or apparatus (such as, for example, the electrode spool 216) which is secured to the arm 214 or portions 212/218 is not balanced symmetrically. When this is the case, and the attachment portion 222 is loosened the portion 222 can be caused to rotate, thus causing injury or damage. The key portion 226 is secured to the attachment portion 222 and engages with groove 214a to prevent such rotation. It is noted that in an embodiment of the invention, the grooves 214a may also similarly exist in portions 212/218. The key portion 226 is to be of a length, dimension and configuration such that inadvertent rotation of a wheel assembly or mounted welding component can be prevented. Any commonly known or used material may be employed. Although a plate-like configuration is shown for the key portion 226 of the shown embodiment, the present invention is not limited in this regard. It is contemplated that any type of commonly known or used key portion or locking mechanism can be employed to prevent inadvertent rotation. Additionally, in a further embodiment of the present invention the key portion 226 is not coupled to the attachment portion 222 and is separately located along the arm 214 or portions 212/218 to provide an anti-rotational effect. In a further embodiment, the key portion 226 is movably engaged with the attachment portion 222 (or with its own mounting mechanism in such embodiments where the key portion 226 is not coupled to the attachment portion 222) such that it can be released from engagement with the grooves 214a to permit rotation when desired. Any commonly known or used mechanism or configuration can be used to provide the movable engagement. For example, the key portion 226 can be provided with an urging force (such as that provided by a spring or similar device) which urges the key portion 226 into the grooves 214a, but also allows the key portion 226 to be withdrawn from the grooves 214a when an opposite force is applied which is larger than the urging force. The present invention is not limited in this regard.

Of course, it is contemplated that the welding carriages disclosed in this application can be configured in any way such that the spirit of the invention is maintained, and the invention is not limited to the exemplary embodiment discussed above.

The present invention has been described with certain embodiments and applications. These can be combined and interchanged without departing from the scope of the invention as defined in the appended claims. The invention as defined in these appended claims are incorporated by reference into the specification of this application as if part of the description of the novel features of the present invention.

We claim:

1. A welding carriage comprising:
   a base,
   at least two wheels disposed at one end of the base;
   a first wheel assembly attachment member disposed on another end of the base;
   a second wheel assembly attachment member disposed on said another end of the base;
   a first wheel assembly removably engaged with the first wheel assembly attachment member, and when removably engaged with the first wheel assembly attachment member said first wheel assembly is securely coupled to said base; and
   a second wheel assembly removably engaged with the second wheel assembly attachment member, and when removably engaged with the second wheel assembly attachment member said second wheel assembly is securely coupled to said base,
   wherein said first wheel assembly can be oriented in at least two different positions with respect to said base,
   wherein said second wheel assembly can be oriented in at least two different positions with respect to said base, and
   wherein said first wheel assembly can be removably engaged with either of said first and second wheel assembly attachment members and said second wheel assembly can be removably engaged with either of said first and second wheel assembly attachment members.

2. The welding carriage of claim 1 wherein the first wheel assembly comprises an arm and a wheel, the arm comprising a base attachment end and a wheel attachment end, the wheel being rotatably attached to the wheel attachment end and the base attachment end being configured to couple with the first wheel assembly attachment member.

3. The welding carriage of claim 1, wherein the second wheel assembly comprises an arm and a wheel, the arm comprising a base attachment end and a wheel attachment end, the wheel being rotatably attached to the wheel attachment end and the base attachment end being configured to couple with the second wheel assembly attachment member.

4. The welding carriage of claim 1, further comprising at least one welding equipment mounting member.

5. The welding carriage according to claim 1, wherein the welding carriage is stable when only one of the first wheel assembly and second wheel assembly is coupled to the base.

6. The welding carriage according to claim 1, wherein each of said first and second wheel assemblies comprise a wheel and each of the first wheel assembly and second wheel assembly are configured so that the respective wheels may be mounted inward or outward with respect to said base.

7. The welding carriage according to claim 4, wherein said at least one welding equipment mounting member has the same outer cross-sectional dimensions as at least a portion of said first wheel assembly.

8. A welding carriage comprising:
   a base;
   at least two wheels coupled to the base;
   at least one wheel assembly mounting arm removably coupled to said base; and
   at least one wheel assembly removably coupled to said at least one wheel assembly mounting arm,
   wherein said at least one wheel assembly can be positioned at a plurality of positions along a length of said at least one wheel assembly mounting arm and can be rotated to a plurality of radial positions with respect to said at least one wheel assembly mounting arm.

9. The welding carriage of claim 8, wherein said at least one wheel assembly comprises at least one wheel and a wheel attachment portion.

10. The welding carriage of claim 9, wherein the wheel attachment portion comprises a wheel mounting portion, a securing portion and a securing mechanism portion.

11. The welding carriage according to claim 8, further comprising
    a second assembly mounting arm removably coupled to said base; and
    a second wheel assembly removably coupled to said second wheel assembly mounting arm,
    wherein said second wheel assembly can be positioned at a plurality of positions along a length of said second wheel assembly mounting arm and can be rotated to a plurality of radial positions with respect to said second wheel assembly mounting arm.

12. The welding carriage of claim 11, wherein said second wheel assembly comprises at least one wheel and a wheel attachment portion.

13. The welding carriage of claim 12, wherein the wheel attachment portion comprises a wheel mounting portion, a securing portion and a securing mechanism portion.

14. The welding carriage according to claim 9, wherein said at least one wheel assembly is configured so that said wheel may be mounted inward or outward with respect to said base.

15. The welding carriage according to claim 12, wherein said second wheel assembly is configured so that the wheel may be mounted inward or outward with respect to said base.

16. The welding carriage according to claim 11, wherein the welding carriage is stable when only one of said at least one wheel assembly and second wheel assembly is coupled to the base.

17. The welding carriage according to claim 8, wherein said at least one wheel assembly mounting arm comprises at least one of a groove or protrusion which engages with said at least one wheel assembly.

18. The welding carriage according to claim 11, wherein both of said at least one wheel assembly mounting arm and said second wheel assembly mounting arm have the same outer cross-sectional dimensions.

19. The welding carriage according to claim 8, further comprising at least one welding equipment mounting portion coupled to said base, wherein said at least one welding equipment mounting portion has the same outer cross-sectional dimensions as said at least one wheel assembly mounting arm.

20. The welding carriage according to claim 8, further comprising at least two welding equipment mounting portions, where one of said mounting portions is coupled to said base and the other of said mounting portions is coupled to said one of said mounting portions, and wherein both of said welding equipment mounting portions have the same outer cross-sectional dimensions and are movably engaged with each other.

21. The welding carriage according to claim 20, wherein said welding equipment mounting portions have the same cross-sectional dimensions with said at least one wheel assembly mounting arm.

22. The welding carriage according to claim 20, wherein an attachment portion is coupled to at least one of said welding equipment mounting portions, and a key portion is coupled to said attachment portion such that said key portion engages with a groove in said at least one welding equipment mounting portion to prevent rotation of said attachment portion.

23. The welding carriage according to claim 8, wherein said at least one wheel assembly includes an attachment portion having a key portion, and wherein said key portion engages with said at least one wheel assembly mounting arm to prevent rotation of said wheel assembly about said at least one wheel assembly mounting arm.

* * * * *